United States Patent Office.

JAMES CHALMERS, OF LONDON, ENGLAND, ASSIGNOR TO JAMES CHALMERS, JR., OF SAME PLACE.

Letters Patent No. 80,709, dated August 4, 1868.

IMPROVEMENT IN NON-CONDUCTORS OF HEAT.

*The Schedule referred to in these Letters Patent and making part of the same.*

TO ALL WHOM IT MAY CONCERN:

Be it known that I, JAMES CHALMERS, of London, England, have invented certain Improvements in Non-Conductors of Heat; and I do hereby declare that the following is a full and exact description thereof.

This invention has for its object the prevention of the radiation of heat from steam-engine boilers and pipes, and other heated surfaces; to protect water-pipes, cisterns, conduits, and other receptacles for fluids or other substances, from frost and cold, and generally to serve as an insulator of heat. It consists of a plastic compound of the following materials:

To make, say, two hundred pounds in weight of the non-conductor compound, I take one hundred pounds of glutinous or any strong clay, and fifty pounds of clay-marl, fullers' earth, or any light silicious clay or loam, free from stones or gravel. I then add about twenty-five pounds in weight of water, and stir or grind in a vessel or machine till the mixture acquires the consistence of a thin paste. Then I gradually add as the stirring or grinding proceeds, twenty pounds of partly-charred or calcined wood saw-dust, which, during the process of calcination, has one pound of soot, and one pound of the refuse of lubricating-oil, or grease, or other fatty matter, added to it, to darken the color, and prevent the burning or charring of the woody fibre of the saw-dust; then four pounds of wood pulp, (such as used in paper-making,) and four pounds of other pulp or fibre, made from old manilla rope, China grass, or other suitable substance. Then, finally, I add four pounds of hoofs, dissolved or ground, and mixed with six pounds in weight of any fish-oil, vegetable oil, or other sufficiently-fatty substance. The stirring or grinding is then continued till the compound is thoroughly mixed, and forms a paste of about the consistence of common plaster-mortar when ready to be applied.

The proportions of the above-mentioned ingredients may be varied, or others of a similar nature, or equivalent in their chemical properties, used instead.

The mode of applying the non-conductor compound is similar to that adopted by plasterers in coating walls or other surfaces. It can be applied in several coats or layers until the requisite thickness is obtained, which may vary, according to circumstances, from half an inch to two and a half inches.

Compositions of a similar nature and for a similar object have been patented and tried in Great Britain, and other countries, which, for lack of sufficient cohesive and non-conducting qualities, or other causes, have been only partially used. I therefore do not claim the invention of a non-conducting composition to prevent the radiation of heat; but What I do claim as my invention is—

The mixture, in the proportions above described, of glutinous and silicious clay, as the basis of a non-conducting compound, the calcination or half-charring of saw-dust, in the manner proposed, so as to preserve its fibrous nature and non-conducting qualities, and the use of wood and other pulp or fibre, and hoofs, prepared as above, for binding and consolidating the non-conductor compound, and for adding to its non-conducting qualities.

In testimony whereof, I have signed my name to this specification in the presence of two subscribing witnesses.

JAMES CHALMERS.

Witnesses:
G. F. WARREN,
JOHN DEAN,
} Both of No. 17 Gracechurch Street, London.